US012693650B2

(12) United States Patent
Castillo Buenaventura et al.

(10) Patent No.: US 12,693,650 B2
(45) Date of Patent: Jul. 28, 2026

(54) INDUSTRIAL TOUCHSCREEN

(71) Applicant: Schneider Electric Industries SAS,
Rueil Malmaison (FR)

(72) Inventors: Felipe Castillo Buenaventura,
Angoulême (FR); Rollan Boulard,
Saint-Yrieix-sur-Charente (FR)

(73) Assignee: Schneider Electric Industries SAS,
Rueil-Malmaison (FR)

( * ) Notice: Subject to any disclaimer, the term of this
patent is extended or adjusted under 35
U.S.C. 154(b) by 260 days.

(21) Appl. No.: 18/238,718

(22) Filed: Aug. 28, 2023

(65) Prior Publication Data

US 2024/0103485 A1     Mar. 28, 2024

(30) Foreign Application Priority Data

Sep. 22, 2022     (EP) ..................................... 22306393

(51) Int. Cl.
*G05B 19/409*     (2006.01)

(52) U.S. Cl.
CPC .. *G05B 19/409* (2013.01); *G05B 2219/36168*
(2013.01)

(58) Field of Classification Search
CPC ........ G05B 19/409; G05B 2219/36168; G05B
19/054; G06F 3/04847; G06F 3/04886;
G06F 3/0488; G06F 3/0416; G06F 3/016;
G06F 3/16
See application file for complete search history.

(56) References Cited

U.S. PATENT DOCUMENTS

| | | | | |
|---|---|---|---|---|
| 10,805,661 | B2 * | 10/2020 | Chai ................ | H04N 21/42224 |
| 2010/0138031 | A1 | 6/2010 | Werfeli et al. | |
| 2016/0357305 | A1 * | 12/2016 | Wells ................. | G06F 3/04842 |
| 2016/0357404 | A1 * | 12/2016 | Alonso Ruiz .......... | G06F 9/451 |
| 2017/0262158 | A1 * | 9/2017 | Webb ................... | G06F 3/0488 |
| 2017/0322721 | A1 * | 11/2017 | Thakur ................ | G06F 3/0488 |

(Continued)

FOREIGN PATENT DOCUMENTS

EP     2305505 A2     4/2011

OTHER PUBLICATIONS

European Search Report and Search Opinion dated Feb. 23, 2023
for corresponding European Patent Application No. 22306393.4, 10
pages.

*Primary Examiner* — Ziaul Karim
(74) *Attorney, Agent, or Firm* — Wolf, Greenfield &
Sacks, P.C.

(57) ABSTRACT

An industrial touchscreen apparatus integrates critical con-
trol functions and visualization features into a single display
while maintaining safe operation of industrial machines. The
apparatus includes a host computing unit for operation
functions and a separate control computing unit for critical
control functions associated with industrial machines. A
mixer module mixes data flows from both computing units,
prioritizing data from the control computing unit to prevent
faults in the visualization system from compromising safe
operation of the critical control functions. The display
presents control widgets for critical control functions in a
critical control zone and graphical indicia for operation
functions in a visualization zone. A touchscreen controller
detects touch input locations and routes them to the appro-
priate computing unit based on the zone.

20 Claims, 4 Drawing Sheets

(56) References Cited

U.S. PATENT DOCUMENTS

| | | | |
|---|---|---|---|
| 2019/0065021 A1* | 2/2019 | Digman | G06F 3/0482 |
| 2020/0057555 A1* | 2/2020 | Walkin | G06F 3/0483 |
| 2021/0090730 A1* | 3/2021 | Patel | H04W 76/14 |
| 2021/0352608 A1* | 11/2021 | Chun | H04M 1/724 |
| 2022/0130348 A1* | 4/2022 | Katsurada | G06F 3/147 |
| 2022/0184309 A1* | 6/2022 | Rosinko | G06F 1/3215 |
| 2023/0393801 A1* | 12/2023 | Boule | G06T 11/00 |

* cited by examiner

S1

TC : determining location of touch input

S2

TC → location → CCU

S3

CCU : determining control widget state associated with location
CCU : triggering critical control function

S4

CCU : updating control widget state
CCU : sending updated state to MM

S5

MM : sending dataflow to DP

S6

MM : retrieving checksum from control widget
CCU : validating checksum

INDUSTRIAL TOUCHSCREEN

CROSS-REFERENCE TO RELATED APPLICATIONS

This patent claims priority under 35 U.S.C. § 119(d) to European Patent Application No. 22306393.4, filed on Sep. 22, 2022, which is hereby incorporated herein by reference in its entirety.

FIELD OF INVENTION

The present disclosure relates generally to touchscreens, more especially to industrial touchscreens.

BACKGROUND

Electronic touch screens (such as displays) are used in many commercial applications including ATMs, automobiles, informational displays, personal computers, cell phones, and the like. Such screens are advantageous as the content may be easily changed and the screens are interactive. An electronic touch screen is desirable for many applications, but requirements or needs for redundancy may prevent the use of such screens.

Examples of such applications include, but are not limited to, commercial aviation, space flight, military applications and industrial processes, where high availability and reliability measures are demanded to ensure continued performance of equipment in the event of a partial failure. Such stringent requirements are demanded because of the potential consequences of failure.

Currently, industrial control panels include a touch screen for visualization and electromechanical buttons for safety related functions.

Such industrial control panels have relied on multiple static keys or buttons to meet industry standards. This may make the design less appealing, more costly and space consuming, and a computing device must manage all of the different static keys. Some industrial control panels integrate static keys with touchscreens. Such touchscreens are typically managed by a microprocessor running a high-level operating system and are not compliant with industry standards. Thus, it has been a challenge for industrial control panels having touchscreens to meet industry standards.

There is therefore a need for a touch screen system having a merged visualization and critical control in an intuitive, seamless, and flexible way.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an apparatus comprising:

a host computing unit for operating the apparatus with operation functions, a control computing unit for operating the apparatus with critical control functions, a touchscreen system, comprising;

a touchscreen configured for receiving touch inputs to the touchscreen;

a display for presenting control widget relating to critical control functions in a critical control zone and graphical indicia relating to operation functions in a visualization zone, a touchscreen controller communicatively coupled with the host computing unit and control computing unit and configured to detect a location of the touch inputs to the touchscreen a mixer module communicatively coupled with the control computing unit and the host computing unit for mixing data flow coming from the control computing unit and the host computing unit with priority to the critical control module, the mixer module providing data flow coming from the control computing unit to the control zone of the display and providing data flow coming from the host computing unit to the visualization zone of the display.

Advantageously, the apparatus allows to seamlessly integrate critical control functions into industrial all-in-one control panels. More precisely, this invention enables to merge critical control functions and visualization features into touchscreen displays in a safe, intuitive, flexible, and seamless fashion, which allows to remove most of the traditional electromechanical control devices from the machine control panel. This is achieved by separating the screen into critical control and visualization zones.

In an embodiment, the visualization zone comprises one zone of the display and the critical control zone comprises one or more zones of the display.

In an embodiment, the critical control functions are deterministic functions with high reliability and low latency and the critical control functions are associated with one or more industrial devices connected to the apparatus.

In an embodiment, the critical control zone comprises predefined digital slots dedicated to control widget for activating critical control functions.

In an embodiment, a control widget provides a set of data and technologies that gather the resources and information to reconstruct a digital representation of a machine control device for controlling an industrial device connected to the apparatus.

In an embodiment, a control widget is associated with one of the following machine control devices that are human machine interface components: push button, selector, slider, encoder and pilot light.

In an embodiment, a machine control device associated with a control widget is configured with a haptic feedback and/or an audio feedback.

In an embodiment, a control widget has at least three different visual states of a machine control device comprising an idle state, a selection state and a fail state.

In an embodiment, one control widget is configured to control a set of machine control devices.

In an embodiment, the apparatus is included in an industrial control panel.

In an embodiment, the control widgets are accompanied by 3D shapes on a cover glass of the touchscreen.

In an embodiment, the control computing unit is configured to:

receive, from the touchscreen controller and in response to a touch input to the touchscreen on a control widget, a location of the touch input to the touchscreen determine the control widget associated with the location and the state of the control widget, trigger a critical control function corresponding to the state of the control widget, update the state of the control widget.

In an embodiment, the control computing unit is configured to:

send a data flow associated with the updated state of the control widget to the mixer module, retrieve a checksum related to the control widget presented on the display from the mixer module and validate the integrity of control widget is the checksum is correct.

Within the critical control zone, predefined digital slots are available to configure critical control functions such as pushbuttons and selectors. For each slot there is a high degree of customization; many properties are available such as type of device, visuals, haptic feedback, and touch input, among others, that enhance the user experience.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
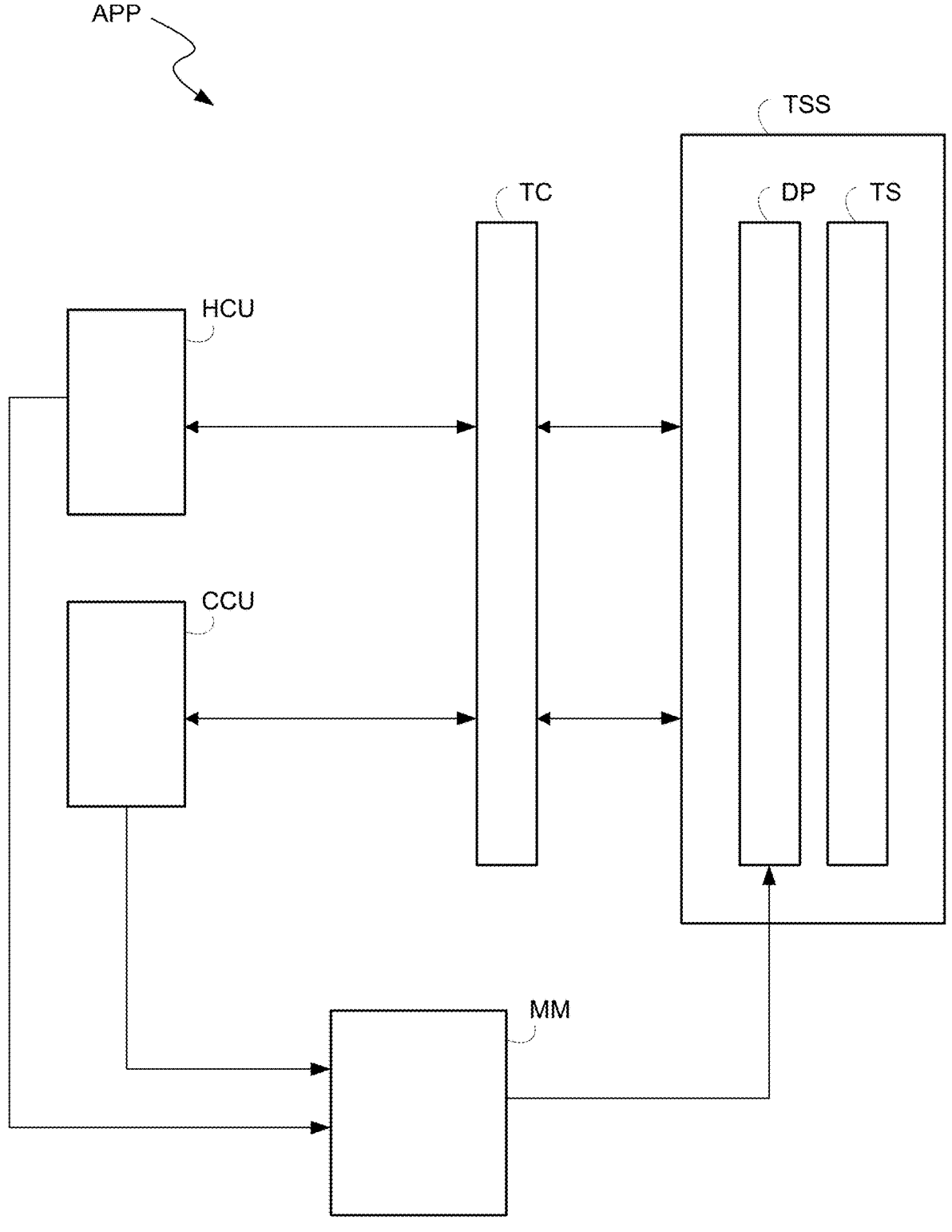
FIG. 1 shows a schematic block diagram of an apparatus with a touch screen system according to one embodiment.

Referring to FIG. 1, an apparatus APP comprises a host computing unit HCU and a control computing unit CCU, a touchscreen system TSS, a. touchscreen controller TC and a mixer module MM.

The apparatus APP can be comprised in an industrial control panel integrating critical control functions.

The touchscreen system TSS comprises a touchscreen TS and a display DP.

The touchscreen TS is a touch-sensitive screen configured for receiving touch inputs. The touchscreen TS may rely on different technologies such as surface capacitive touchscreen, projected capacitive touchscreen, resistive touchscreen, surface acoustic wave touchscreen, and an infrared touchscreen as non-limited examples.

The display DP is configured for presenting control indicia relating to critical control functions in a control zone and operation indicia relating to operation functions in a visualization zone.

The touchscreen system TSS forms a touchscreen assembly that constitutes a user interface of the apparatus that may be any device using an industrial control panels with a touchscreen display interface.

The touchscreen controller TC is communicatively coupled with the host computing unit HCU and the control computing unit CCU and configured to detect a location of the touch inputs to the touchscreen TS.

In one embodiment, the touchscreen system TSS is based on a projected capacitive technology is using a capacitive grid and conductivity of human body. When a finger comes close to the patterning of X and Y electrodes, i.e. the capacitive grid, a capacitance coupling will occur between the finger and the electrodes. The capacitance coupling makes the electrostatic capacitance between the X and Y electrodes change. The touch screen system detects touched points as it checks where on the electrode lines the electrostatic capacitance changed.

In other words, bringing a finger or conductive stylus as a touch input near the surface of the capacitive grid changes the local electric field which reduces the mutual capacitance. The capacitance change at every individual point on the capacitive grid can be measured to accurately determine the touch location by measuring the voltage in the other axis.

In one embodiment, the touchscreen TS can comprise suitable hardware that registers input events in response to touch (e.g., by a finger, stylus, gloved hand, pen, etc.). In some implementations, the touchscreen TS can detect the position of an object (e.g., by a finger, stylus, gloved hand, pen, etc.) over the touchscreen TS within close proximity (e.g., a few centimeters) to touchscreen without the object touching the screen. As used herein, unless otherwise specified, reference to "on the touchscreen" refers to contact between an object (e.g., a user's finger) and the touchscreen while reference to "over the touchscreen" refers to positioning of an object within close proximity to the touchscreen (e.g., a defined distance away from the touchscreen) yet not contacting the touchscreen.

In one embodiment, the touchscreen TS can comprise also suitable hardware that registers pression of a touch on the touchscreen TS, like a piezo actuator. The input event in response to a touch on the touchscreen is validated if the registered pression is above a predefined threshold to ensure the touch was intentional for a critical control function for example.

The host computing unit HCU implements an operating system that commands the user interface of the apparatus and other components of the apparatus like a microphone, a speaker etc. The host computing unit HCU may implement different communication interfaces which provides means for communication with other devices via different kinds of telecommunication network, and especially with industrial devices via an industrial network. In particular, the host computing unit HCU receives data from the touchscreen controller TC in order to interpret user actions on the touch screen corresponding to the visualization zone of the display.

The control computing unit CCU implements an operating system independently from the host computing unit HCU that commands the critical-control functions of the user interface of the apparatus.

The control computing unit CCU may implement different communication interfaces which provides means for communication with industrial devices via an industrial network. In one embodiment, the control computing unit CCU is not connected directly to the industrial network. In one embodiment, the host computing unit HCU forwards critical data to the control computing unit CCU. In particular, the control computing unit CCU receives data from the touchscreen controller TC in order to interpret user actions on the touch screen corresponding to the critical control zone of the display.

The host computing unit HCU and the control computing unit CCU are dedicated to respective zones of the screen, visualization zone and critical control zone, implying that that any fault in the visualization system, i.e. from the host computing unit HCU, will not compromise the safe operation of the critical control system, i.e. for the control computing unit CCU.

The control computing unit CCU implement critical control functions that are deterministic functions with high reliability and low latency and that are associated with one or more industrial machines connected to the apparatus. To that end, the apparatus APP can be connected for example to a programmable logic controller (PLC) that commands the industrial machines.

The programmable logic controller (PLC) that commands the industrial machines can be local with the apparatus APP or can be remote via a network interconnecting the programmable logic controller and the apparatus.

The mixer module MM is communicatively coupled with the host computing unit HCU and the control computing unit CCU for mixing data flow coming from the host computing unit HCU and the control computing unit CCU with priority to the control computing unit CCU. In one embodiment, the mixer module MM uses priority as a top frame.

In some examples, the mixer module MM can comprise a LVDS splitter, a timing controller, a FPGA or any component able to control the display.

Figure 2:
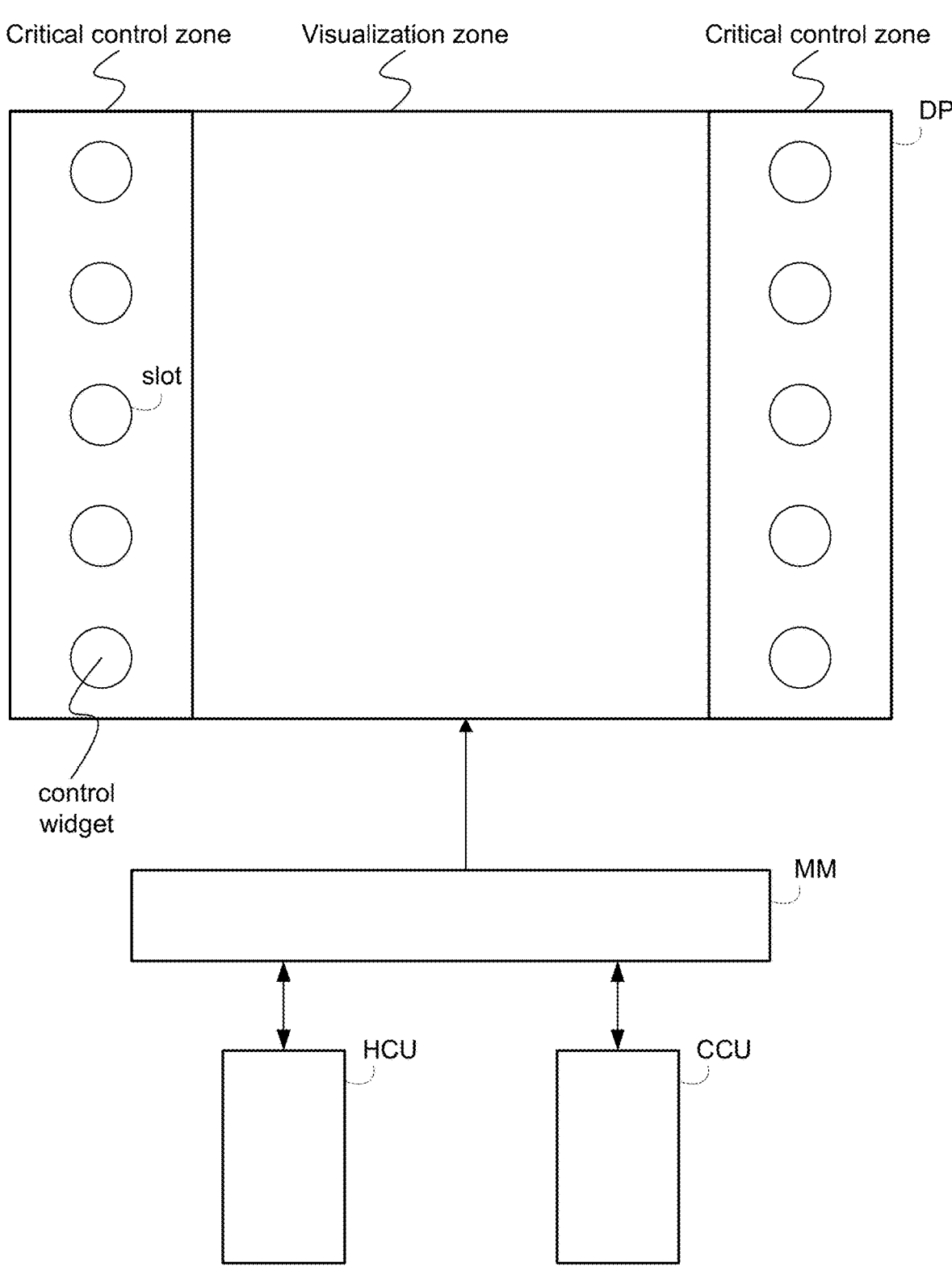
FIG. 2 shows a simplified schematic of a display with a visualization zone and one or more critical control zones.

Referring to FIG. 2, the apparatus allows a separation between the visualization and the critical control functions at user interface level, while using the same touchscreen display presenting a visualization zone and one or more critical control zones.

The visualization zone provides a simple and effective means for connecting systems, collecting data and presenting information in a meaningful format. The critical control zone ensures a robust, safe, ergonomic and easy control of machines and manufacturing lines.

From a user perspective, there will be a seamless integration of the visualization and critical control since all would be present on the same touchscreen.

Different configuration of the visualization zone and the one or more critical control zones can be provided. In one embodiment, one critical control zone is placed on one border of the display, i.e. on top, bottom, left or right of the display. In another embodiment, two critical control zones are placed on two opposite borders of the display, i.e. on top and bottom or on left and right of the display.

In one embodiment, the critical control zone is a strip where digital representations of machine control devices, such as pushbuttons and selector, are configured. The strip is divided into a determined number of slots where digital representations of machine control devices like Human Machine Interface components can be setup. A digital representation of a machine control device is provided by a control widget defined hereinafter.

In one embodiment, said digital representations are accompanied by 3D shapes on a cover glass of the touchscreen which allow creating a distinctive physical layout and help the user to better differentiate various functions relating to the digital representations.

Each slot is associated with the required mechanisms to support the critical control functions covered by the scope of the control widgets. For example, the mechanism is one of the following: Push buttons, selectors, sliders, encoders, pilot lights.

In one embodiment, control widgets are placed in the slots available for that purpose. This is done with the objective of ensuring that all mechanisms to perform critical control functions are available and that the interface complies with what is required from such functions.

When a user wishes to initiate a critical control function on the apparatus by selecting a widget corresponding to said critical control functions, the control computing unit CCU is able to retrieve location of a touch input on the widget and to determine that said location corresponds to said widget (for example via a correspondence table linking each widget with a set of coordinates of the touchscreen).

The control computing unit CCU retrieves a state of the widget to trigger the corresponding critical control function by sending instructions to the programmable logic controller. Then the control computing unit CCU updates the state of the widget and sends data flow associated with the state update to the mixer module MM.

The mixer module MM is then able to provide the data flow coming from the control computing unit CCU to the control zone of the display, and more especially to the slot dedicated to the widget, in order to present the widget with the updated state.

Furthermore, the mixer module MM is able to send Error Detection Code related to the image of the widget presented on the display DP to the control computing unit CCU that can check if the presented image is correct.

Figure 3:
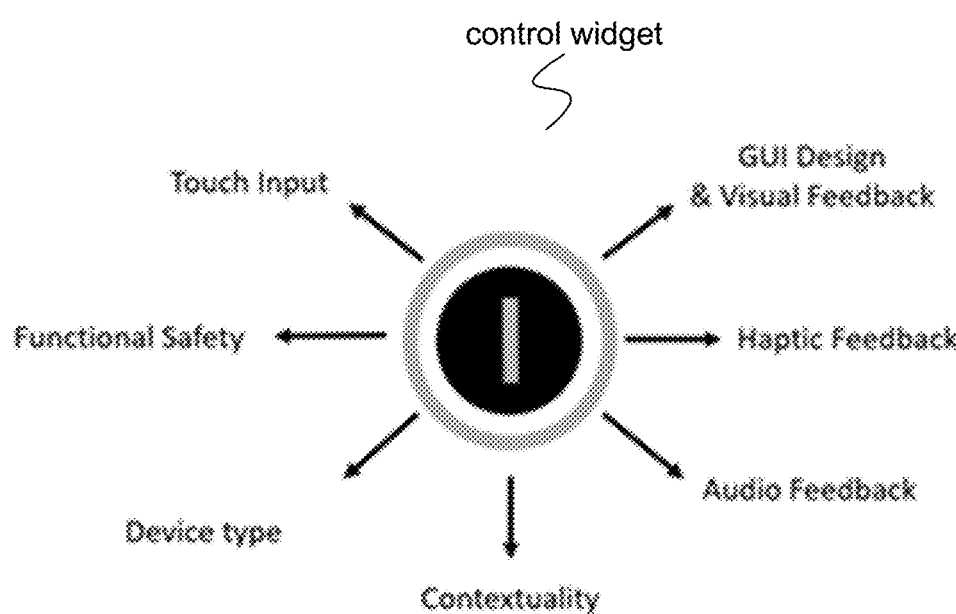
FIG. 3 shows a simplified schematic of a control widget with key properties.

Referring to FIG. 3, the key properties of a control widget are represented. These consist in a set of data and technologies that gather all the resources and information to reconstruct a digital representation of a machine control device like a Human Machine Interface component. These key properties are for example at least the device type, contextuality, audio feedback, haptic feedback, GUI design and visual feedback, touch input, functional safety.

The digital representations of the control device leverage touch technology, displays, haptics, audio, digital flexibility and contextuality to provide users an enhanced experience with the interface which would not be possible with traditional electromechanical devices.

The device type corresponds to the first step of a control widget configuration, which is to define what type of control widget is needed, this will then set the safety level required, the design options and the widget behaviors. The device type corresponds to the type of machine control device that can be one of the following components, not limited to human machine interface components: push buttons, selectors, sliders, encoders, pilot lights.

Contextuality is the capacity of the control widget to adapt to a specific set of system states, providing more control and user feedback options from the same control widget slot. Since the control widget is digitally configured, it is indeed possible to affect many machine control devices on one control widget slot.

To perform this contextual behavior, the control widget data set may contain multiple configurations which would be enabled as a function of the system state. This approach allows having more control functions available in the interface without the need of adding more control widget slots on the touchscreen.

The touch input corresponds to the touch technology that allows translating the tactile action from the user into the digital system without any electromechanical action. The control widget provides a set of parameters to customize certain behaviors and properties of the touch input such as sensitivity, debounce time, scan resolution, among many others. The touch technology can be a mixture of two technologies such as projective capacitive and piezo electric. Often this mixture of technologies is proposed to provide technology redundancy in the touch input which may be a requirement for functional safety.

The action expected by the user following up a touch input can also be configured within the control widget. Namely, the choice of desired behavior of the input. For example, a touch input of a button can be configured to be a latch, monostable, bistable, etc.

The control widget allows configuring the graphical user interface (GUI) design with a set available options associated with the required type of device. Users can define the pictogram, theme and colors, legend that will be available in the control widget library. As the control widget can be contextual, different GUI can be configured to fit the system state.

Once the GUI of the control widget is set, there is provided a visual feedback that corresponds to the dynamic behavior of the GUI with respect to the user input and system state Visual feedback is a key feature to interact with the user since it allows to acknowledge the actions and provide essential control related information.

Each control widget can have at least these different visual states that could be configured:

the idle state (no action performed on the device)
the selection state (action performed on the device)
the fail state (control widget disabled due to a failure)
additional visual could be available such as "unavailable state"

For safety related functions, safe GUI mechanisms along with the corresponding hardware are considered to guarantee the integrity of all visual features of control widgets.

The haptic feedback improves the user experience. To that end, the control widget is designed to have a haptic configuration, offering possibilities to configure each control widget with a specific haptic feedback that will reenact the tactile feeling experienced with traditional control device. This configuration can also include more haptic behaviors to offer new ways to alert the user by providing haptic feedback.

The haptic feedback can be provided to a user interfacing with the touchscreen in association with interaction with the widget displayed on the touchscreen and the haptic feedback can be provided by a haptic feedback driver linked to the touchscreen. In various embodiments, the haptic feedback can be in the form of a vibration or vibration pattern generated by a vibration unit. In this regard, the haptic driver can control the vibration unit to generate the vibration feedback when the finger (or other object) moves on or over the widget and maintain the vibration until the finger move off of the widget (e.g., when the finger is no longer positioned on or over the widget).

In one embodiment, the haptic feedback configuration is designed to work along with 3D shapes on a cover glass on the touchscreen. This enables finger guidance design to give a full tactile experience to the user.

The same way as the haptic feedback it is possible to configure within the control widget parameters to provide audio feedback. Audio feedback can be also a kind of specific signature feedback that is unique to every type of widget or usage to enhance the user's awareness. The audio can be combined with the haptic feedback to stimulate in depth the senses of the user and reenact experiences felt with traditional electromechanical devices.

In some embodiments, audio feedback can be used in conjunction with haptic feedback to further enhance a user's ability to interface with the touchscreen TS without looking at the touchscreen. For example, the audio feedback can include sounds such as beeps, clicks, pops, ticks, buzzing, etc., that can be used to identify or indicate when a user is pointing at or touching a widget on the touchscreen TS.

In some embodiments, different sounds can also be used to differentiate between and/or identify different widgets and their different visual states. In one embodiment, the audio feedback can include spoken words or phrases.

Since the control widgets make part of the safety chain, all required mechanisms to guarantee the reliability performance level are available for the functional safety.

These mechanisms include a safe GUI render for the visuals of the control widgets, redundant and highly reliable touch interfaces, safe MCUs to integrate the safety chain and safe configuration tools to set up the interface.

The control widget data structure and system integration are designed to preserve data integrity at any time. Integration in the system ensures that critical control widgets can manage inputs in real time and in a deterministic way.

The control computing unit CCU is able to drive the display DP to change the contextuality of a control widget, e.g. from a "Start" graphic to a "Stop" graphic.

Figure 4:
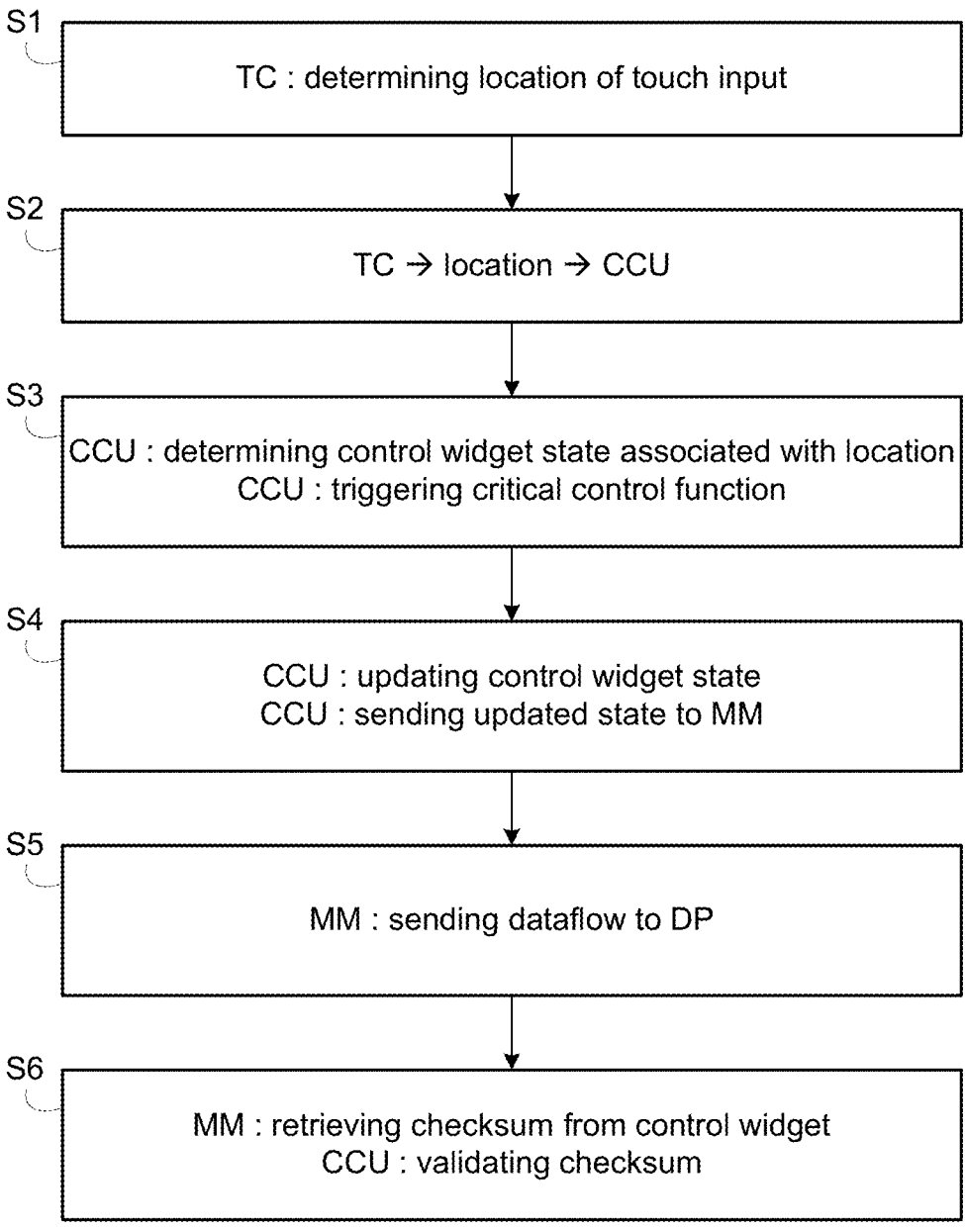
FIG. 4 is a flow diagram of a method for operating an apparatus with critical control functions according to one embodiment.

In one embodiment, after control computing unit CCU determines that a user has initiated a safety-critical operation by pressing a control widget, control computing unit CCU controls the display DP to present an opportunity for the user to confirm the initiation of the safety critical operation. The changing screen and indicia of the control widget make pressing the confirmation indicia intuitive to confirm initiation of the safety-critical operation With reference to FIG. 4, a method for operating an apparatus with critical control functions according to one embodiment of the invention comprises steps S1 to S6.

In step S1, a user wishes to initiate a critical control function on the apparatus by selecting a widget corresponding to said critical control functions.

A touch input is received on the touchscreen of the touchscreen assembly. The touch input is provided in the critical control zone to begin initiation of the safety-critical operation.

The touchscreen controller TC determines a location of the touch input on the touchscreen which corresponds to the critical control zone. Upon receiving the touch input, the touchscreen controller determines or registers the location of the touch input to the touchscreen, e.g., by processing the electrical pulses generated when one or more of the driving lines being pressed into one or more of the sensing lines. For example, the location may be registered as an X-Y coordinate.

In step S2, as the location of the touch input corresponds to the critical control zone, the touchscreen controller TC sends the location of the touch input to the control computing unit CCU. If a touch input corresponds to the visualization zone, the touchscreen controller TC sends the location of the touch input to the host computing unit HCU.

In step S3, the control computing unit CCU determines the control widget associated with the location and retrieves the contextuality of the widget. The control computing unit CCU checks the state of the control widget to trigger the critical control function corresponding to the state of the control widget and sends instructions for said critical control function to a programmable logic controller. The programmable logic controller can then command an industrial device with the instructions.

Thus the action on the widget associated with a human machine interface component like a button has replaced the action on a physical button.

In step S4, the control computing unit CCU updates the state of the control widget and sends data flow associated with the updated state of the control widget to the mixer module MM. In one embodiment, the data flow comprises an Error Detection Code related to the image of the control widget to be presented on the display DP.

In step S5, the mixer module MM provides the data flow coming from the control computing unit CCU to the display DP, and more especially to the slot dedicated to the control widget, in order to present the control widget with the updated state. For example, the control widget presents now a "Stop" graphic, after the user has pressed the touchscreen on the control widget with a "Start" graphic.

In step S6, the mixer module MM retrieves a checksum related to the control widget presented on the display DP and sends the checksum to the control computing unit CCU. The control computing unit CCU validates the integrity of the control widget is the checksum is validated.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. An apparatus comprising:
a host computing unit for operating the apparatus with operation functions,
a control computing unit for operating the apparatus with critical control functions associated with one or more industrial machines connected to the apparatus,
a touchscreen system comprising;
a touchscreen configured for receiving touch inputs to the touchscreen; and
a display for presenting control widget relating to critical control functions in a critical control zone and graphical indicia relating to operation functions in a visualization zone, a touchscreen controller communicatively coupled with the host computing unit and control computing unit and configured to detect a location of the touch inputs to the touchscreen;
a mixer module communicatively coupled with the control computing unit and the host computing unit for mixing data flow coming from the control computing unit and the host computing unit,
the mixer module providing data flow coming from the control computing unit to the control zone of the display and providing data flow coming from the host computing unit to the visualization zone of the display, and
wherein the mixer module is configured to prevent faults from the host computing unit from compromising safe operation of the critical control functions associated with one or more industrial machines by prioritizing the data flow coming from the control computing unit over the data flow coming from the host computing unit.

2. The apparatus according to claim 1, wherein the visualization zone comprises one zone of the display and the critical control zone comprises one or more zones of the display.

3. The apparatus according to claim 1, wherein the critical control functions are deterministic functions with high reliability and low latency and the critical control functions are associated with one or more industrial devices connected to the apparatus.

4. The apparatus according to claim 1, wherein the critical control zone comprises predefined digital slots dedicated to control widget for activating critical control functions.

5. The apparatus according to claim 1, wherein a control widget provides a set of data and technologies that gather resources and information to reconstruct a digital representation of a machine control device for controlling an industrial device connected to the apparatus.

6. The apparatus according to claim 1, wherein a control widget is associated with one of the following machine control devices that are human machine interface components: push button, selector, slider, encoder and pilot light.

7. The apparatus according to claim 1, wherein a machine control device associated with a control widget is configured with a haptic feedback and/or an audio feedback.

8. The apparatus according to claim 1, wherein a control widget has at least three different visual states of a machine control device comprising an idle state, a selection state and a fail state.

9. The apparatus according to claim 1, wherein one control widget is configured to control a set of machine control devices.

10. The apparatus according to claim 1, included in an industrial control panel.

11. The apparatus according to claim 1, wherein the control widgets are accompanied by 3D shapes on a cover glass of the touchscreen.

12. The apparatus according to claim 1, wherein the control computing unit is configured to:
receive, from the touchscreen controller and in response to a touch input to the touchscreen on a control widget, a location of the touch input to the touchscreen,
determine the control widget associated with the location and a state of the control widget, trigger a critical control function corresponding to the state of the control widget, and
update the state of the control widget.

13. The apparatus according to claim 1, wherein the control computing unit is configured to:

send a data flow associated with the updated state of the control widget to the mixer module; and retrieve a checksum related to the control widget presented on the display from the mixer module and validate an integrity of control widget is the checksum is correct.

14. A method for operating an industrial touchscreen apparatus, the method comprising:

operating, by a host computing unit, the apparatus with operation functions;

operating, by a control computing unit, the apparatus with critical control functions associated with one or more industrial machines connected to the apparatus;

receiving, by a touchscreen, touch inputs to the touchscreen;

presenting, by a display, control widgets relating to critical control functions in a critical control zone and graphical indicia relating to operation functions in a visualization zone;

detecting, by a touchscreen controller communicatively coupled with the host computing unit and control computing unit, a location of the touch inputs to the touchscreen;

mixing, by a mixer module communicatively coupled with the control computing unit and the host computing unit, data flow coming from the control computing unit and the host computing unit;

providing, by the mixer module, data flow coming from the control computing unit to the control zone of the display and data flow coming from the host computing unit to the visualization zone of the display; and preventing, by the mixer module, faults occurring in the host computing unit from compromising safe operation of the critical control functions associated with one or more industrial machines by prioritizing the data flow coming from the control computing unit over the data flow coming from the host computing unit.

15. The method according to claim 14, wherein the visualization zone comprises one zone of the display and the critical control zone comprises one or more zones of the display.

16. The method according to claim 14, wherein the critical control functions are deterministic functions with high reliability and low latency.

17. The method according to claim 14, wherein the critical control zone comprises predefined digital slots dedicated to control widgets for activating critical control functions.

18. The method according to claim 14, further comprising configuring a machine control device associated with a control widget with a haptic feedback and/or an audio feedback.

19. The method according to claim 14, further comprising:

receiving, by the control computing unit and from the touchscreen controller in response to a touch input to the touchscreen on a control widget, a location of the touch input to the touchscreen;

determining, by the control computing unit, the control widget associated with the location and a state of the control widget;

triggering, by the control computing unit, a critical control function corresponding to the state of the control widget; and updating, by the control computing unit, the state of the control widget.

20. The method according to claim 19, further comprising:

sending, by the control computing unit, a data flow associated with the updated state of the control widget to the mixer module; and retrieving, by the control computing unit, a checksum related to the control widget presented on the display from the mixer module and validating an integrity of the control widget based on the checksum.

* * * * *